US012485307B2

(12) United States Patent
Cheng et al.

(10) Patent No.: US 12,485,307 B2
(45) Date of Patent: Dec. 2, 2025

(54) EXERCISE MAT AND METHODS FOR MAKING EXERCISE MAT (71) Applicant: LULULEMON ATHLETICA CANADA INC., Vancouver (CA)

(72) Inventors: Warren Christopher Howren Cheng, Vancouver (CA); Miguel Angel Herrera Macias, Vancouver (CA); San Chyi Wang, Vancouver (CA)

(73) Assignee: LULULEMON ATHLETICA CANADA INC., Vancouver (CA)

( * ) Notice: Subject to any disclaimer, the term of this patent is extended or adjusted under 35 U.S.C. 154(b) by 84 days.

(21) Appl. No.: 18/566,546

(22) PCT Filed: May 26, 2022

(86) PCT No.: PCT/CA2022/050851
§ 371 (c)(1),
(2) Date: Dec. 1, 2023

(87) PCT Pub. No.: WO2022/256913
PCT Pub. Date: Dec. 15, 2022

(65) Prior Publication Data
US 2024/0261627 A1    Aug. 8, 2024

Related U.S. Application Data (60) Provisional application No. 63/197,909, filed on Jun. 7, 2021.

(51) Int. Cl.
*A63B 21/00* (2006.01)
*B32B 3/06* (2006.01)
(Continued)

(52) U.S. Cl.
CPC ............ *A63B 21/4037* (2015.10); *B32B 3/06* (2013.01); *B32B 3/08* (2013.01); *B32B 3/16* (2013.01);
(Continued)

(58) Field of Classification Search
CPC ............ A63B 21/4037; A63B 2209/00; A63B 2209/02; A63B 2209/023;
(Continued)

(56) References Cited

U.S. PATENT DOCUMENTS 2,590,049 A * 3/1952 Sidlinger ................. A63B 5/11
482/28
4,147,828 A    4/1979 Heckel et al.
(Continued)

FOREIGN PATENT DOCUMENTS

WO    2016029297 A1    3/2016

OTHER PUBLICATIONS

International Search Report and Written Opinion for PCT Application No. PCT/CA2022/050851 dated Jul. 29, 2022.

*Primary Examiner* — Gary D Urbiel Goldner (57) ABSTRACT

Examples of an exercise mat and methods for making same are disclosed. The exercise mat comprises a top layer comprising a plurality of pieces put together to form the top layer of the mat, a bottom cushioning layer removably attached to the top layer, and a fastener configured to secure together the top layer and the bottom layer of the exercise mat. The plurality of pieces of the top layer can be woven or sewn together creating a textured surface on the top layer of the mat.

12 Claims, 4 Drawing Sheets

(51) Int. Cl.
   *B32B 3/08*      (2006.01)
   *B32B 3/16*      (2006.01)
   *B32B 5/02*      (2006.01)
   *B32B 5/26*      (2006.01)
   *B32B 7/08*      (2019.01)
   *D03D 1/00*      (2006.01)
   *D03D 13/00*     (2006.01)
   *D03D 15/46*     (2021.01)

(52) U.S. Cl.
   CPC .............. *B32B 5/024* (2013.01); *B32B 5/262* (2021.05); *B32B 7/08* (2013.01); *D03D 1/00* (2013.01); *D03D 13/004* (2013.01); *D03D 15/46* (2021.01); *B32B 2250/02* (2013.01); *B32B 2307/744* (2013.01); *B32B 2471/04* (2013.01); *D10B 2503/04* (2013.01)

(58) Field of Classification Search
   CPC .......... A63B 2209/026; A63B 2209/14; A63B 2209/18; A63B 2210/00; A63B 2210/50; B32B 3/06; B32B 3/08; B32B 3/16; B32B 5/024; B32B 5/18; B32B 5/245; B32B 5/262; B32B 5/263; B32B 5/275; B32B 7/08; B32B 25/10; B32B 27/12; B32B 2250/02; B32B 2262/02; B32B 2262/0292; B32B 2262/062; B32B 2262/08; B32B 2272/00; B32B 2307/56; B32B 2307/744; B32B 2471/04; D03D 1/00; D03D 13/004; D03D 15/46; D10B 2503/04
   See application file for complete search history.

(56) References Cited

U.S. PATENT DOCUMENTS

| | | | |
|---|---|---|---|
| 2012/0240336 A1 | 9/2012 | Dandapure et al. | |
| 2013/0171432 A1 | 7/2013 | Dandapure et al. | |
| 2014/0242357 A1* | 8/2014 | Morris | A63B 21/4037 428/196 |
| 2016/0059065 A1* | 3/2016 | Fasullo | A63B 21/4037 5/417 |
| 2017/0319896 A1* | 11/2017 | Kramer | A63B 21/4037 |
| 2018/0126692 A1* | 5/2018 | Dandapure | A63B 6/00 |
| 2018/0250549 A1* | 9/2018 | Paton | D03D 3/08 |
| 2018/0266021 A1* | 9/2018 | Kalati | B32B 5/024 |
| 2021/0121733 A1* | 4/2021 | Morris | B32B 3/30 |
| 2021/0346751 A1* | 11/2021 | Paton | D03D 15/58 |
| 2022/0152449 A1* | 5/2022 | Chien | D03D 15/47 |

* cited by examiner

EXERCISE MAT AND METHODS FOR MAKING EXERCISE MAT

TECHNICAL FIELD

This application relates to the field of mats, and more specifically, to exercise mats and the like, and methods of making same.

BACKGROUND

Exercise mats, pads and cushions are often used during a variety of exercise activities that are conducted on a floor surface, such as yoga and Pilates. Many existing exercise mats are made of rubber, foam or other cushioning materials to provide comfort and cushioning to a user over hard flooring. For example, a user may position an exercise mat on a hard floor surface to provide a more comfortable experience during various yoga poses or stretching exercises.

Conventional mats are generally thick and heavy foam pads that are difficult to transport easily. Furthermore, the foam used in conventional exercise mats breaks down relatively quickly, and necessitates frequent replacement of the mats. Although these exercise mats provide general cushioning during exercise, they do not provide the requisite cushioning for isolated body parts that receive the greatest amount of pressure, such as the hands, knees and feet. Creating a thicker pad would make the exercise mat too cumbersome to transport easily. Exercising typically results in perspiration of the user, which can cause an upper surface or face of the exercise mat to become wet and slippery, particularly if exercise mats are made of non-breathable material, such as rubber. Mats with an open cell structure may help to absorb and dissipate sweat such that grip on the mat is maintained.

Thus, there remains a need for exercise mats that are lightweight and easy to transport, fully supportive to the user's body, and are textured to avoid slipping.

SUMMARY OF THE APPLICATION

In various embodiments, the present disclosure provides exercise mats that may be easy to transport, fully supportive to a user's body and reduce slipping on a top surface thereof.

In one aspect, the present disclosure provides an exercise mat comprising: a top layer comprising a plurality of adjoining pieces; a bottom layer removably attached to the top layer, the bottom layer having a thickness to provide cushioning; and a fastener configured to secure the top layer and the bottom layer together, wherein when the top layer and the bottom layers are aligned and adjacent, the fastener secures the top and bottom layers of the exercise mat in close proximity and prevents dissociation of the top and bottom layers from each other.

In various embodiments, the fastener comprises at least two pockets formed at a bottom surface of the top layer, each pocket in proximity to two edges of the top layer and having an opening, the at least two pockets being sized and shaped to receive a corresponding at least two edges of the bottom layer. Alternatively, the fastener comprises at least two pockets formed at a top surface of the bottom layer, each pocket in proximity to two edges of the bottom layer and having an opening, the at least two pockets being sized to receive a corresponding at least two edges of the top layer. Alternatively, the fastener comprises at least two elastic bands formed at either a bottom surface of the top layer or a top surface of the bottom layer. Alternatively, the fastener comprises a curved peripheral edge around a top surface of the bottom layer of the mat configured so that the top layer is tucked under and held in place by the curved edge. Alternatively, the fastener comprises a curved peripheral edge around a bottom side of the top layer of the mat configured so that the bottom layer is tucked under and held in place by the curved edge.

In various embodiments, the plurality of adjoining pieces of the top layer is a plurality of elongated ribbons woven to create a woven textured surface on the top layer. For example, the top layer may further comprises a flat surface comprising a plurality of slits, each of the plurality of slits having a width greater than a width of a corresponding ribbon of the plurality of elongated ribbons, wherein the plurality of elongated ribbons is woven through the plurality of slits to form the woven textured surface on the top layer. In various embodiments, the woven textured surface of the top layer comprises at least one zone with a tighter weave pattern and at least one zone with a roomier or looser weave pattern. For example, the at least one zone with a tighter weave pattern and the at least one zone with a roomier or looser weave pattern are joined by a seamless transition.

Alternatively, the plurality of adjoining pieces of the top layer are sewn together, creating a flat surface defining a size and shape of the top layer of the exercise mat with a plurality of seam lines generating a textured surface on the top layer.

In various embodiments, the top layer comprises a polyurethane, polymer fibers, regenerative cellulosic fibers, natural fibers, a fabric, a non-woven fabric, a woven fabric, leather, a rubber, a foam material, a recycled polymer, a recycled fabric, a recycled rubber, a biomaterial or a combination thereof. For example, the top layer may comprise a biomaterial engineered by growing fungi.

In various embodiments, the bottom layer may comprise polymer fibers, regenerative cellulosic fibers, natural fibers, a fabric, a non-woven fabric, a woven fabric, a felt, a rubber, a foam material, a recycled polymer, a recycled fabric, a recycled rubber, a biomaterial or combinations thereof.

In another aspect, the present disclosure provides an exercise mat comprising a top layer comprising a plurality of elongated ribbons woven to create a woven textured surface on the top layer; and a bottom layer attached to the top layer.

In various embodiments, the exercise mat further comprises a flat surface defining a size and a shape of the top layer, the flat surface comprising a plurality of slits, each of the plurality of slits having a width greater than a width of a corresponding ribbon of the plurality of elongated ribbons, wherein the plurality of elongated ribbons is woven through the plurality of slits to form the woven textured surface on the top layer.

In various embodiments, the woven textured surface of the top layer comprises at least one zone with a tighter weave pattern and at least one zone with a looser weave pattern. In various embodiments, the at least one zone with a tighter weave pattern and the at least one zone with a looser weave pattern are joined together by a seamless transition.

In various embodiments, the exercise mat further comprises a fastener configured to detachably attach the top layer and the bottom layer of the exercise mat, wherein when the top and bottom layers are aligned and adjacent, the fastener secures the top and the bottom layers of the mat in close proximity and prevents dissociation of the top and bottom layers from each other. For example, the fastener may comprise at least two pockets formed at a bottom surface of the top layer, each pocket in proximity to two edges of the top layer and having an opening, the at least two pockets being sized to receive a corresponding at least two edges of the bottom layer. Alternatively, the fastener may comprise at least two pockets formed at a top surface of the bottom layer, each pocket in proximity to two edges of the bottom layer and having an opening, the at least two pockets being sized to receive a corresponding at least two edges of the top layer. Alternatively, the fastener may comprise at least two elastic bands formed at either a bottom surface of the top layer or a top surface of the bottom layer.

In various embodiments, the top layer may comprise a polyurethane, polymer fibers, regenerative cellulosic fibers, natural fibers, a fabric, a non-woven fabric, a woven fabric, leather, a rubber, a foam material, a recycled polymer, a recycled fabric, a recycled rubber, a biomaterial or a combination thereof. For example, the top layer may comprise a biomaterial engineered by growing fungi.

In various embodiments, the bottom layer comprises polymer fibers, regenerative cellulosic fibers, natural fibers, a fabric, a non-woven fabric, a woven fabric, a felt, a rubber, a foam material, a recycled polymer, a recycled fabric, a recycled rubber, a biomaterial or a combination thereof.

In a further aspect, the present disclosure provides an exercise mat comprising a top layer comprising a plurality of pieces sewn together to create a flat surface defining a size and shape of the top layer of the exercise mat with a plurality of seam lines forming a textured surface on the top layer; and a bottom layer attached to the top layer.

In various embodiments, the exercise mat further comprises a fastener configured to detachably attach the top layer and the bottom layer of the exercise mat, wherein when the top layer and the bottom layers are aligned and adjacent, the fastener secures the top and the bottom layers of the mat in close proximity and prevents dissociation of the top and bottom layers. For example, the fastener may comprise at least two pockets formed at a bottom surface of the top layer, each pocket in proximity to two edges of the top layer and having an opening, the at least two pockets being sized to receive a corresponding at least two edges of the bottom layer. Alternatively, the fastener may comprise at least two pockets formed at a top surface of the bottom layer, each pocket in proximity to two edges of the bottom layer and having an opening, the at least two pockets being sized to receive a corresponding at least two edges of the top layer. Alternatively, the fastener may comprise at least two elastic bands formed at either a bottom surface of the top layer or a top surface of the bottom layer.

In various embodiments, the top layer comprises a polyurethane, polymer fibers, regenerative cellulosic fibers, natural fibers, a fabric, a non-woven fabric, a woven fabric, leather, a rubber, a foam material, a recycled polymer, a recycled fabric, a recycled rubber, a biomaterial or a combination thereof. For example, the top layer may comprise a biomaterial engineered by growing fungi.

In various embodiments, the bottom layer comprises polymer fibers, regenerative cellulosic fibers, natural fibers, a fabric, a non-woven fabric, a woven fabric, a felt, a rubber, a foam material, a recycled polymer, a recycled fabric, a recycled rubber, a biomaterial or a combination thereof.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the application. Sizes and relative positions of elements in the drawings are not necessarily drawn to scale. For example, the shapes of various elements and angles may be not drawn to scale, and some of these elements may be arbitrarily enlarged and positioned to improve drawing legibility.

DETAILED DESCRIPTION

In the following description, details are set forth to provide an understanding of the application. In some instances, certain structures, techniques, and methods have not been described or shown in detail in order not to obscure the application.

In the context of the present disclosure, various terms are used in accordance with what is understood to be the ordinary meaning of those terms.

Disclosed embodiments include exercise mats and methods of making same. In various embodiments, the disclosure provides exercise mats that are lightweight, easy to transport, provide improved support to the body of a user, and reduce the likelihood of the user slipping on a surface of the exercise mat. The exercise mats are for placement on a flat surface by a user to provide cushioning, grip, support or stability, or any combination thereof, allowing the user to more easily and effectively perform yoga or other exercises.

Figure 1:
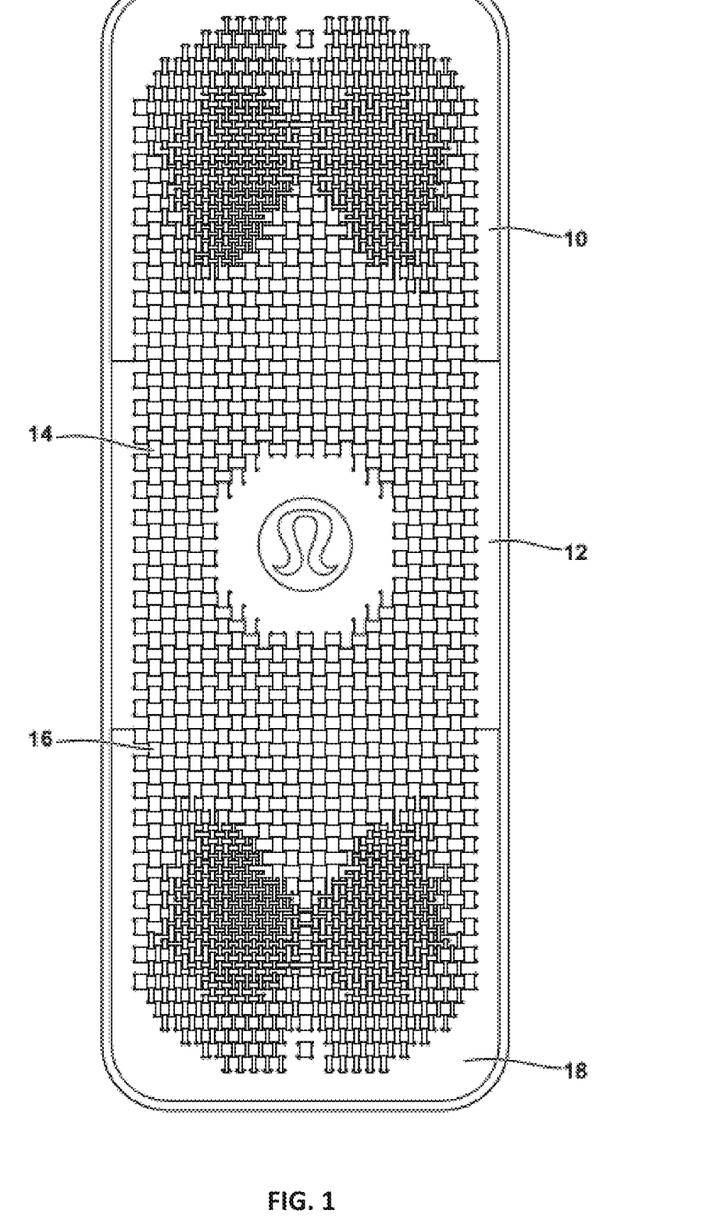
FIG. 1 is a photo of an example of a top layer of an exercise mat having an engineered woven top surface texture according to an embodiment of the disclosure.

Referring to FIG. 1 and according to a first embodiment of the invention, an exercise mat 10 is shown. The exercise mat 10 comprises a top layer 12. The top layer 12 may provide a level of friction that provides sufficient grip to the user without restricting the user's movement. In various embodiments, the top layer 12 comprises a plurality of adjoining pieces 14. The plurality of adjoining pieces 14 may provide a textured surface 16 on a top surface 18 of the top layer 12. The textured surface 16 may increase the user's grip or reduce the user's slipping on the exercise mat 10 during use. The top layer 12 may comprise a polyurethane, polymer fibers, regenerative cellulosic fibers, natural fibers, a fabric, a non-woven fabric, a woven fabric, leather, a rubber, a foam material, a recycled polymer, a recycled fabric, a recycled rubber, a biomaterial, or a combination thereof. For example, the top layer 12 may comprise a biomaterial engineered by growing fungi. In alternative embodiments, the top layer 12 comprises mycelium leather. The corners of the top layer 12 may be rounded, square, or a combination thereof. The exercise mat is of sufficient size to support a typical user's body through a wide range of exercise movements and positions. Although a rectangular exercise mat is shown in the Figures, the exercise mat may have other shapes, such as square, circle or oval, or any other shape or design.

Figure 3:
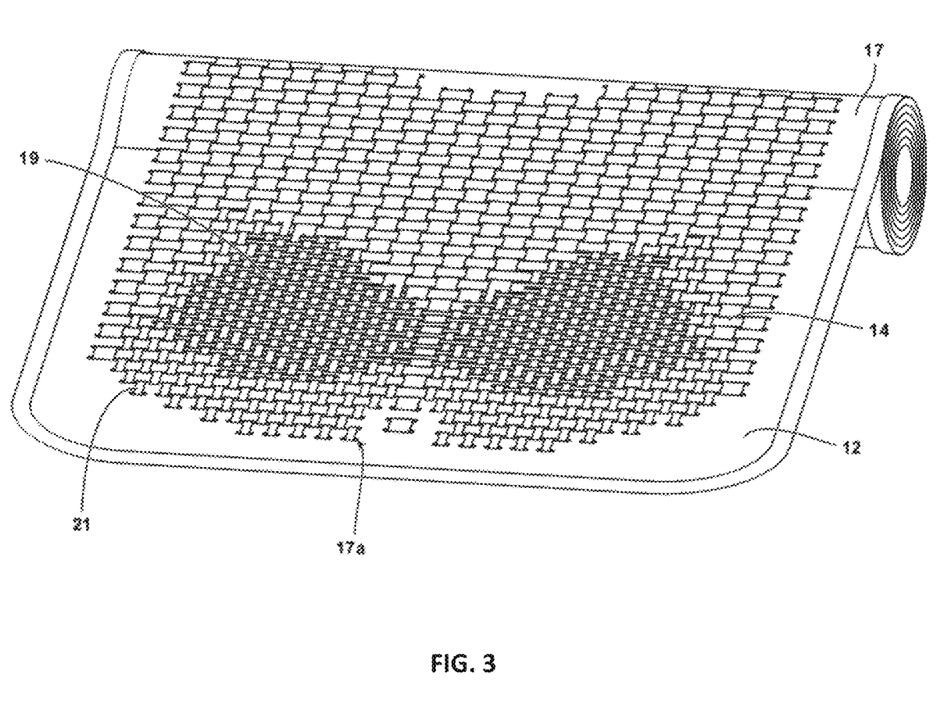
FIG. 3 is a photo of an example of the exercise mat of FIG. 1 partially rolled.

In various embodiments, the plurality of adjoining pieces 14 of the exercise mat 10 is a plurality of elongated ribbons woven to create a woven textured surface on the top layer 12, as shown in FIGS. 1 and 3. For example, the top layer 12 may include a flat surface 17 that comprises a plurality of slits 17a, each of the plurality of slits 17a having a width greater than a width of a corresponding ribbon of the plurality of elongated ribbons. The plurality of elongated ribbons is woven through the plurality of slits 17a to form the woven textured surface of the top layer 12. In various embodiments, the weave pattern may be modified to create areas or zones with different weave patterns as shown in FIGS. 1 and 3. This embodiment may provide different textures on different areas or zones of the top layer 12, depending, for example, on whether certain areas of the mat are used more frequently for different parts of the user's body. For example, during an exercise class or session, certain areas of the top layer 12 of the exercise mat 10 may be touched more often by the hands, knees and/or feet, and therefore, it is desirable that these areas have a tighter weave pattern than other areas to improve grip and support for the user's body. Areas of the exercise mat 10 where the user often sits may have a looser or roomier weave pattern in order for this area or zone of the exercise mat 10 to feel softer. In various embodiments, the woven textured surface of the top layer 12 comprises at least one zone with a tighter weave pattern 19 and at least one zone with a roomier or looser weave pattern 21 (FIG. 3). The at least one zone with a tighter weave pattern 19 and the at least one zone with a roomier or looser weave pattern 21 may be joined by a seamless transition. This transition may be achieve by modified the slit pattern that is cut in the flat surface 17 of the top layer 12.

Thus, the top layer 12 of the exercise mat 10 may be prepared by cutting the plurality of slits 17a in the flat surface 17, weaving the plurality of elongated ribbons through the plurality of slits 17a, and folding and stitching along the edges of the flat surface 17 to form the top layer 12.

Figure 4:
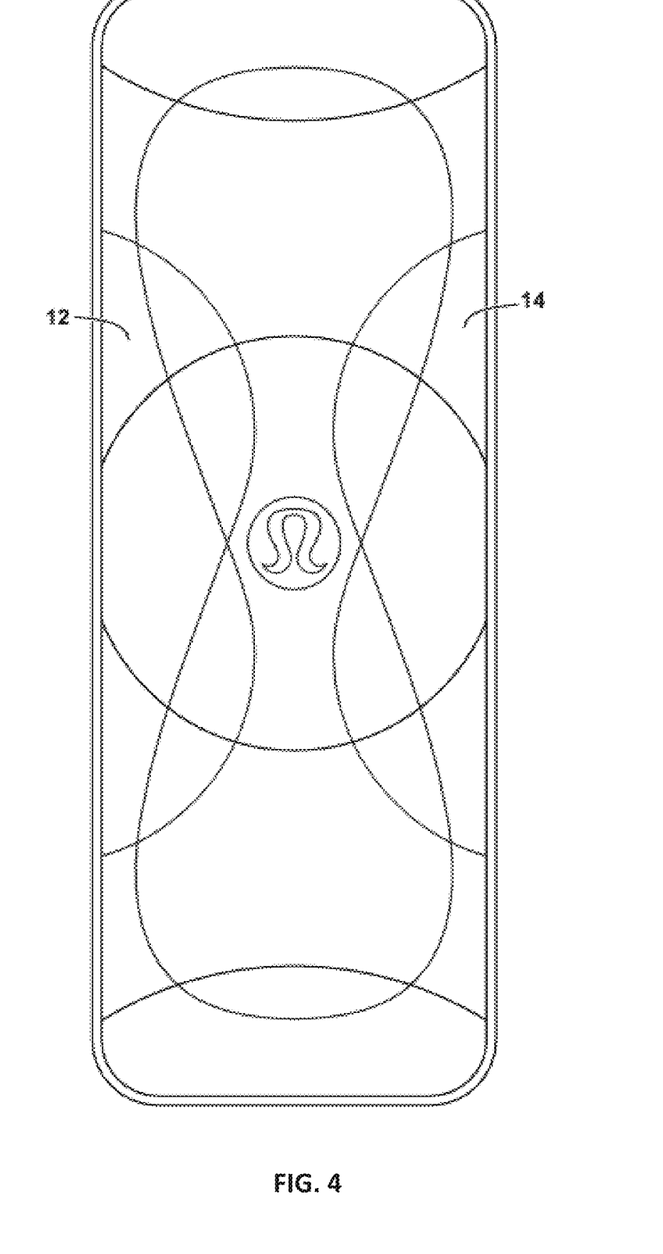
FIG. 4 is a photo of another example of an exercise mat according to an alternative embodiment of the disclosure.

As shown in FIG. 4, the plurality of adjoining pieces 14 of the exercise mat may be sewn together. By sewing the plurality of adjoining pieces 14 together, the top layer 14 may be created as a flat surface defining a size and shape of the top layer of the exercise mat 10 with a plurality of seam lines forming the textured surface on the top layer 12. In various embodiments, the sewing pattern may be modified to create areas or zones with different sewing patterns. For example, instead of the plurality of adjoining pieces 14 being of the same size and/or shape, the plurality of adjoining pieces 14 may have multiple different sizes and/or shapes such that certain areas or zones of the top layer 12 have more seams or a higher density of seams, as compared to other areas or zones of the top layer 12. This embodiment provides different textures on different areas or zones of the top layer 12, depending, for example, on whether certain areas of the mat are used more frequently for different parts of the user's body. For example, and as described above, during an exercise class or session, certain areas of the top layer 12 of the exercise mat 10 may be touched more often by the hands, knees and/or feet, and therefore, it is desirable that these areas have more seams or a higher density of seams than other areas. Areas of the exercise mat 10 where the user often sits may have fewer seams or a lower density of seams in order for this area or zone of the exercise mat 10 to be softer. In various embodiments, the sewn textured surface of the top layer 12 comprises at least one zone with a pattern including more seams and at least one zone with a second pattern including fewer seams.

Thus, the top layer 12 of the exercise mat 10 may be prepared by cutting and sewing together the plurality of adjoining pieces 14 to form a pre-determined pattern of seams, and folding and stitching along the outer edges to form the top layer 12.

In various embodiments, the top layer 12 may be treated with an antimicrobial agent, such as, for example, a silver-based antimicrobial agent and/or 3-trimethoxy silyl propyl dimethyl octadecyl ammonium chloride.

Figure 2:
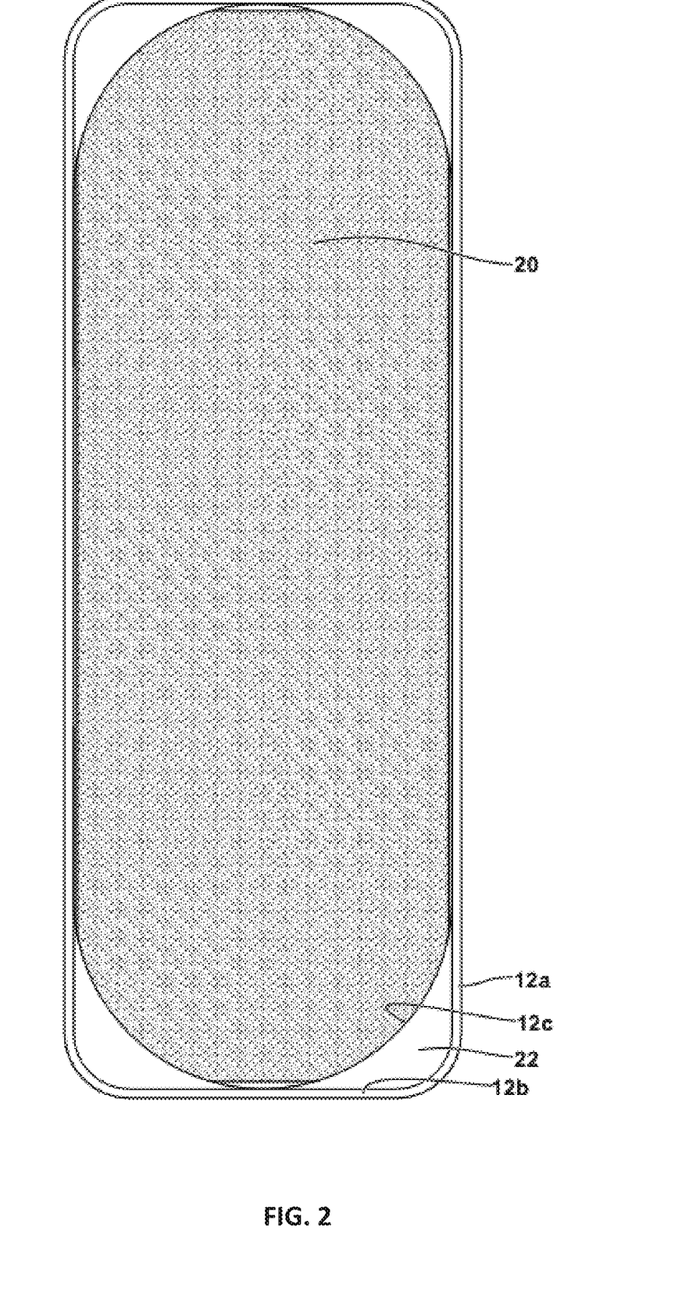
FIG. 2 is a photo of a bottom of an example of an exercise mat according to an embodiment of the disclosure, showing a removable bottom cushioning layer secured to a bottom of a top layer.

The exercise mat 10 also includes a bottom layer 20 as shown in FIG. 2. The bottom layer 20 may be removably attachable to the top layer 12, or alternatively, the bottom layer 20 may be attached to the top layer 12 by any suitable bonding technique. The bottom layer 20 provides cushioning to the user while the exercise mat 10 is in use. The bottom layer 20 can also provide friction and/or traction so that when the bottom layer 20 is placed in contact with a floor by the user, the exercise mat 10 does not slide when the user utilizes the exercise mat 10. In various embodiments, the bottom layer 20 can comprise a plurality of pieces put together to form a pattern. Some of the plurality of pieces can be denser and/or thinner than other pieces, such that the user is closer to the ground when positioned on such pieces. For example, the denser and/or thinner pieces can be located in areas where it is required to improve traction with the flooring to increase the stability of the user during exercise. The less dense and/or thicker pieces may be in areas of the exercise mat 10 where more cushioning is desired by the user. In various embodiments, the bottom layer 20 is more compressible than the top layer 12. In various embodiments, a bottom surface of the bottom layer 20 may include a textured surface and/or an anti-skid coating or finish to prevent the exercise mat 10 from slipping on the floor when in use. In various embodiments, the bottom layer 20 comprises polymer fibers, regenerative cellulosic fibers, natural fibers, a fabric, a non-woven fabric, a woven fabric, a felt, a rubber, a foam material, a recycled polymer, a recycled fabric, a recycled rubber, a biomaterial, or a combination thereof.

The exercise mat 10 may also include a fastener 22 configured to secure the top layer 12 and the bottom layer 20 together. When the top layer 12 and the bottom layer 20 are aligned, for example, aligned along their respective edges, and adjacent, the fastener 22 secures the top layer 12 and the bottom layer 20 in close proximity and prevents dissociation of the top layer 12 and the bottom layer 20 from each other.

In various embodiments, the fastener 22 may include at least two pockets formed at a bottom surface 24 of the top layer 12, each pocket in proximity to two edges (12a and 12b) of the top layer 12 and having an opening 12c, as shown in FIG. 2. The opening 12c of each of the at least two pockets is sized and shaped to receive a corresponding at least two edges, such as a corner, of the bottom layer 20. For example, the fastener 22 may include two pockets, three pockets or four pockets.

Alternatively, the fastener 22 may include at least two pockets formed at a top surface of the bottom layer 20, each pocket in proximity to two edges of the bottom layer 20 and having an opening. The opening of each of the at least two pockets is sized and shaped to receive a corresponding at least two edges, such as a corner, of the top layer 12. For example, the fastener 22 may include two pockets, three pockets or four pockets.

In further embodiments, the fastener 22 may comprise at least two elastic bands formed at either a bottom surface of the top layer 12 or a top surface of the bottom layer 20. Each of the at least two elastic bands may wrap around a corresponding at least two edges of the bottom layer 20 or a corresponding at least two edges of the top layer 12, respectively. For example, the fastener 22 may include two elastic bands, three elastic bands or four elastic bands.

In various embodiments, the fastener 22, for example, the at least two pockets or the at least two elastic bands, may be sewn onto the bottom side of the top layer 12 when the outer edge of the top layer 12 is folded over and stitched, thereby securing the fastener 22 to the top layer 12. Alternatively, the fastener 22 may be sewn onto the bottom side of the top layer 12 after the outer edge of the top layer 12 is folded over and stitched. The fastener 22 may be attached to the top surface of the bottom layer 20 by sewing the fastener 22 to the bottom layer 20.

In further embodiments, the fastener 22 may be defined by a curved circumferential outer edge formed on either a top side of the bottom layer 20 or a bottom side of the top layer 12, configured so that the other layer of the exercise mat 10 can be tucked under and held in place by the curved edge.

For purposes of transporting the exercise mat 10, the top layer 12 and the bottom layer 20 can be rolled either individually or when they are attached or secured together. In various embodiments, the top layer 12 may be rolled and the bottom layer 20 may be folded.

While particular elements, embodiments and applications of the present application have been shown and described, it will be understood, that the scope of the application is not limited thereto, since modifications can be made by those skilled in the art without departing from the scope of the present application, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this application. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the application.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

What is claimed is:

1. An exercise mat comprising:
   a top layer comprising a plurality of adjoining pieces;
   a bottom layer removably attached to the top layer, the bottom layer having a pre-determined thickness to provide cushioning; and
   a fastener configured to secure the top layer and the bottom layer together, wherein when the top layer and the bottom layers are aligned and adjacent, the fastener secures the top and bottom layers of the exercise mat in close proximity and prevents dissociation of the top and bottom layers from each other;
   wherein the plurality of adjoining pieces of the top layer is a plurality of elongated ribbons woven to create a woven textured surface on the top layer; and
   wherein the top layer further comprises a flat surface that comprises a plurality of slits, each of the plurality of slits having a width greater than a width of a corresponding ribbon of the plurality of elongated ribbons, wherein the plurality of elongated ribbons is respectively woven through the plurality of slits to form the woven textured surface on the top layer.

2. The exercise mat of claim 1, wherein the fastener comprises:
   (a) at least two pockets formed at a bottom surface of the top layer, each pocket in proximity to two edges of the top layer and having an opening, the at least two pockets being sized and shaped to receive a corresponding at least two edges of the bottom layer;
   (b) at least two pockets formed at a top surface of the bottom layer, each pocket in proximity to two edges of the bottom layer and having an opening, the at least two pockets being sized to receive a corresponding at least two edges of the top layer;
   (c) at least two elastic bands formed at either the bottom surface of the top layer or the top surface of the bottom layer; or
   (d) a curved peripheral edge on either the bottom surface of the top layer or the top surface of the bottom layer.

3. The exercise mat of claim 1, wherein the woven textured surface on the top layer comprises at least one zone with a tighter weave pattern and at least one zone with a roomier weave pattern.

4. The exercise mat of claim 3, wherein the at least one zone with the tighter weave pattern and the at least one zone with the roomier weave pattern are joined by a seamless transition.

5. The exercise mat of claim 1, wherein the top layer comprises: a polyurethane, polymer fibers, regenerative cellulosic fibers, natural fibers, a fabric, a non-woven fabric, a woven fabric, leather, a rubber, a foam material, a recycled polymer, a recycled fabric, a recycled rubber, a biomaterial, a biomaterial engineered by growing fungi, or a combination thereof.

6. The exercise mat of claim 1, wherein the bottom layer comprises: polymer fibers, regenerative cellulosic fibers, natural fibers, a fabric, a non-woven fabric, a woven fabric, a felt, a rubber, a foam material, a recycled polymer, a recycled fabric, a recycled rubber, a biomaterial, or combinations thereof.

7. An exercise mat comprising:
   a top layer comprising a plurality of elongated ribbons woven to create a woven textured surface on the top layer; and
   a bottom layer attached to the top layer;
   wherein the top layer further comprises a flat surface that comprises a plurality of slits, each of the plurality of slits having a width greater than a width of a corresponding ribbon of the plurality of elongated ribbons, wherein the plurality of elongated ribbons is respectively woven through the plurality of slits to form the woven textured surface on the top layer.

8. The exercise mat of claim 7, wherein the woven textured surface on the top layer comprises at least one zone with a tighter weave pattern and at least one zone with a roomier weave pattern.

9. The exercise mat of claim 8, wherein the at least one zone with the tighter weave pattern and the at least one zone with the roomier weave pattern are joined by a seamless transition.

10. The exercise mat of claim 7, further comprising a fastener configured to detachably attach the top layer and the bottom layer of the exercise mat, wherein when the top and bottom layers are aligned and adjacent, the fastener secures the top and the bottom layers of the exercise mat in close proximity and prevents dissociation of the top and bottom layers from each other.

11. The exercise mat of claim 10, wherein the fastener comprises:
   (a) at least two pockets formed at a bottom surface of the top layer, each pocket in proximity to two edges of the top layer and having an opening, the at least two pockets being sized to receive a corresponding at least two edges of the bottom layer;
   (b) at least two pockets formed at a top surface of the bottom layer, each pocket in proximity to two edges of the bottom layer and having an opening, the at least two pockets being sized to receive a corresponding at least two edges of the top layer;
   (c) at least two elastic bands formed at either the bottom surface of the top layer or the top surface of the bottom layer; or
   (d) a curved peripheral edge on either the bottom surface of the top layer or the top surface of the bottom layer.

12. The exercise mat of claim 7, wherein the top layer comprises: a polyurethane, polymer fibers, regenerative cellulosic fibers, natural fibers, a fabric, a non-woven fabric, a woven fabric, leather, a rubber, a foam material, a recycled polymer, a recycled fabric, a recycled rubber, a biomaterial, a biomaterial engineered by growing fungi, or a combination thereof, and/or the bottom layer comprises: polymer fibers, regenerative cellulosic fibers, natural fibers, a fabric, a non-woven fabric, a woven fabric, a felt, a rubber, a foam material, a recycled polymer, a recycled fabric, a recycled rubber, a biomaterial, or combinations thereof.

* * * * *